United States Patent
Kim et al.

(10) Patent No.: US 7,751,464 B2
(45) Date of Patent: Jul. 6, 2010

(54) METHOD OF DATA TRANSMISSION WITH ITERATIVE MULTI-USER DETECTION AND APPARATUS USING THE SAME

(75) Inventors: Young-Doo Kim, Suwon-si (KR); Eung Sun Kim, Suwon-si (KR); Chang Wook Ahn, Gwangju (KR); Gi-Hong Im, Pohang-si (KR); Jong-Bu Lim, Pohang-si (KR); Tae-Won Yune, Pohang-si (KR); Chan-Ho Choi, Pohang-si (KR)

(73) Assignees: Samsung Electronics Co., Ltd., Suwon-si (KR); Postech Academy-Industry Foundation, Ohang-si (KR)

( * ) Notice: Subject to any disclaimer, the term of this patent is extended or adjusted under 35 U.S.C. 154(b) by 557 days.

(21) Appl. No.: 11/768,563

(22) Filed: Jun. 26, 2007

(65) Prior Publication Data

US 2008/0192809 A1 Aug. 14, 2008

(30) Foreign Application Priority Data

Feb. 13, 2007 (KR) .................... 10-2007-0014929

(51) Int. Cl.
*H04L 27/30* (2006.01)
(52) U.S. Cl. .............. 375/144; 375/148; 375/346; 455/501; 455/63.1; 455/271; 455/296
(58) Field of Classification Search .......... 375/144, 375/148, 267, 285, 340, 346, 347, 349; 455/46, 455/501, 63.1, 67.13, 226.1–226.3, 271, 455/273, 278.1, 296
See application file for complete search history.

(56) References Cited

U.S. PATENT DOCUMENTS

| 5,013,348 | A | 5/1991 | Hirota |
| 5,249,269 | A | 9/1993 | Nakao et al. |
| 6,529,495 | B1* | 3/2003 | Aazhang et al. ............. 370/342 |
| 6,553,058 | B1* | 4/2003 | Naito ......................... 375/148 |
| 6,600,729 | B1* | 7/2003 | Suzuki ....................... 370/335 |
| 6,999,498 | B2 | 2/2006 | Mills et al. |

(Continued)

FOREIGN PATENT DOCUMENTS

KR 10-2005-0080680 A 8/2005

(Continued)

*Primary Examiner*—Dac V Ha
(74) *Attorney, Agent, or Firm*—Sughrue Mion, PLLC

(57) ABSTRACT

A method and apparatus for transmitting and receiving data by performing an iterative multi-user detection is provided. The apparatus includes: a receives a transmission signal and generates a received signal, the transmission signal being generated by modulating a single carrier signal via a modulation process, specialized for each user, in a wireless communication system; an interference canceled signal generator which generates an interference canceled signal by canceling a signal interference using a demodulated signal with respect to the received signal, the signal interference being caused by an other user; and a demodulated signal generator which generates the demodulated signal by demodulating the received signal via a demodulation process using the interference canceled signal, the demodulation process being specialized for each user, wherein the demodulated signal, which is generated by performing the generating of the interference canceled signal and the generating of the demodulated signal at least once, is adopted as a final demodulated signal.

25 Claims, 7 Drawing Sheets

U.S. PATENT DOCUMENTS

| | | |
|---|---|---|
| 7,092,464 B2 | 8/2006 | Mills |
| 2002/0191535 A1 | 12/2002 | Sugiyama et al. |
| 2005/0013348 A1* | 1/2005 | Visoz et al. ............... 375/148 |
| 2005/0249269 A1* | 11/2005 | Tomasin et al. ........... 375/148 |
| 2006/0221808 A1 | 10/2006 | Shirakata et al. |
| 2009/0296786 A1* | 12/2009 | Massicotte et al. ........ 375/148 |

FOREIGN PATENT DOCUMENTS

| | | |
|---|---|---|
| KR | 10-2005-0098962 A | 10/2005 |
| KR | 10-2006-003089 A | 1/2006 |
| KR | 10-2006-0102185 A | 9/2006 |
| KR | 10-2006-0111416 A | 10/2006 |

* cited by examiner

METHOD OF DATA TRANSMISSION WITH ITERATIVE MULTI-USER DETECTION AND APPARATUS USING THE SAME

CROSS-REFERENCE TO RELATED APPLICATION

This application claims priority from Korean Patent Application No. 10-2007-0014929, filed on Feb. 13, 2007, in the Korean Intellectual Property Office, the entire disclosure of which is incorporated herein by reference.

BACKGROUND OF THE INVENTION

1. Field of the Invention

Methods and apparatuses consistent with the present invention relate to a method and apparatus for transmitting and receiving data by performing an iterative multi-user detection using a frequency domain equalizer.

2. Description of Related Art

A single carrier system using a frequency domain equalizer has a similar structure and performance as an orthogonal frequency division multiplexing (OFDM) system. However, in the OFDM system, a high peak-to-average power ratio (PAPR) causes a nonlinear distortion which results in spreading a spectrum to a neighboring band and deteriorating signal quality. Also, a carrier frequency error destroys orthogonality between subcarriers in the OFDM system and thus causes the performance deterioration of the entire system. To solve the above-described problems, the single carrier system using the frequency domain equalizer is developed and is also highlighted as a promising uplink transmission technique of next generation wireless communication system including $3^{rd}$ Generation Partnership Project Long Term Evolution (3GPP LTE).

However, in a multi-user environment where the same time-frequency resources are simultaneously shared by a plurality of users, bit error performance and cell capacity are limited due to multi-user interference. For example, when the same resource is used between neighboring cells, users in cell edge areas may be exposed to the multi-user interference at all times.

Accordingly, there is a need for a predetermined algorithm capable of canceling multi-user interference.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. Accordingly, it is an aspect of the present invention to provide a method and apparatus for transmitting and receiving data by performing an iterative multi-user detection using a frequency domain equalizer.

An aspect of the present invention is to cancel multi-user interference and thereby improve bit error performance and cell capacity.

According to an aspect of the present invention, there is provided a method of transmitting and receiving data, the method including: receiving a transmission signal and generating a received signal, the transmission signal being generated by modulating a single carrier signal via a modulation process, specialized for each user, in a wireless communication system; generating an interference canceled signal by canceling a signal interference using a demodulated signal with respect to the received signal, the signal interference being caused by a multi-user; and generating the demodulated signal by demodulating the received signal via a demodulation process using the interference canceled signal, the demodulation process being specialized for each user, wherein the demodulated signal, which is generated by performing the generating of the interference canceled signal and the generating of the demodulated signal at least once, is adopted as a final demodulated signal.

Also, according to another aspect of the present invention, there is provided an apparatus for transmitting and receiving data, the apparatus including: a receiver which receives a transmission signal and generates a received signal, the transmission signal being generated by modulating a single carrier signal via a modulation process, specialized for each user, in a wireless communication system; an interference canceled signal generator which generates an interference canceled signal by canceling a signal interference using a demodulated signal with respect to the received signal, the signal interference being caused by a multi-user; and a demodulated signal generator which generates the demodulated signal by demodulating the received signal via a demodulation process using the interference canceled signal, the demodulation process being specialized for each user, wherein the demodulated signal, which is generated by using the interference canceled signal generator and the demodulated signal generator at least once, is adopted as a final demodulated signal.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF THE EXEMPLARY EMBODIMENTS

Figure 1:
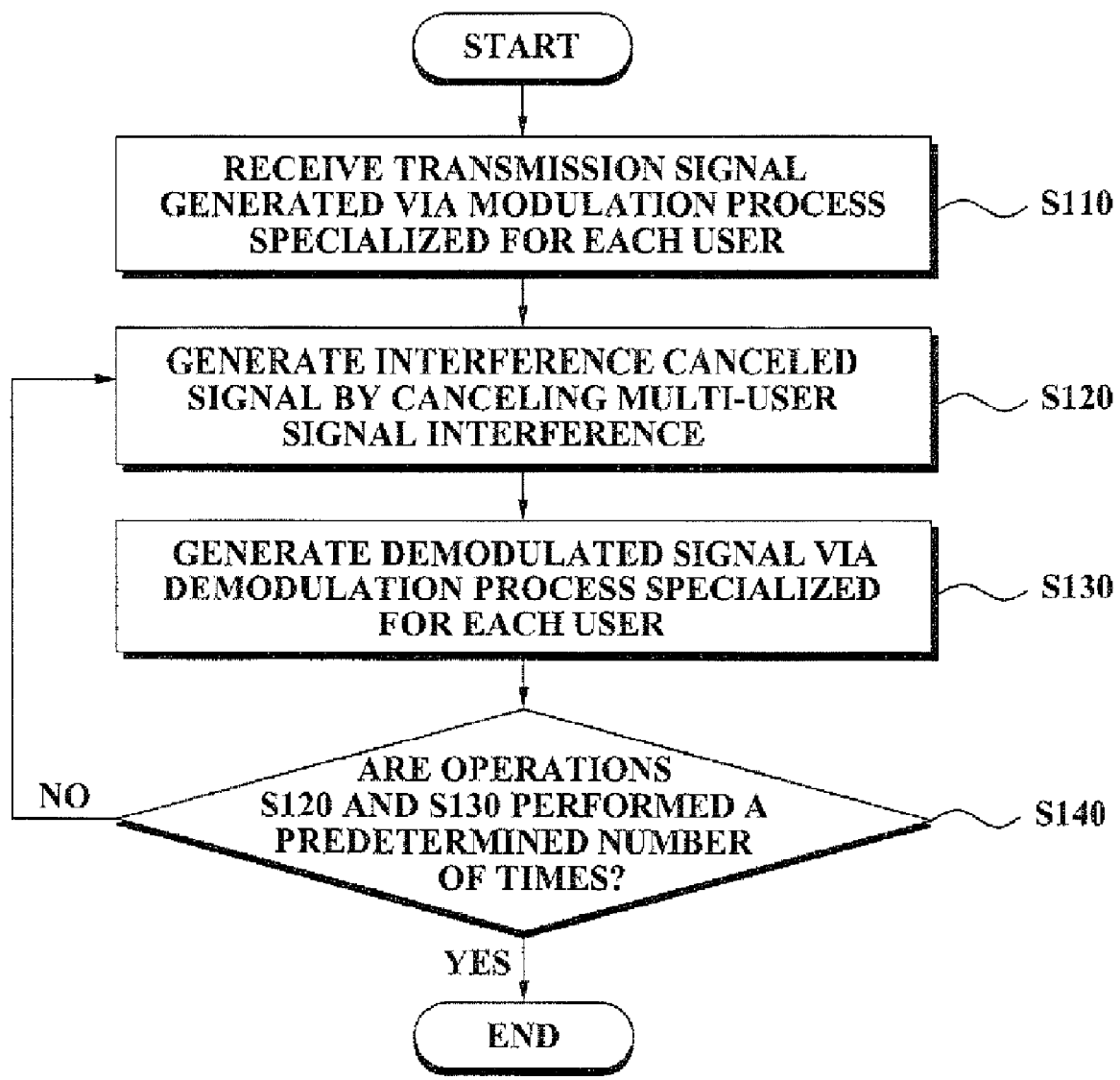
FIG. 1 is a flowchart illustrating a method of transmitting and receiving data according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a flowchart illustrating a method of transmitting and receiving data according to an exemplary embodiment of the present invention.

Referring to FIG. 1, in operation S110, the method for transmitting and receiving data receives a transmission signal and generates a received signal from the transmission signal. In this instance, the transmission signal is generated by modulating a single carrier signal via a modulation process, specialized for each user, in a wireless communication system. In other words, the modulation process is unique for each user.

Also, operation S110 may include generating received signal blocks by eliminating a cyclic prefix symbol from a front portion of the received signal.

In operation S120, the method of transmitting and receiving data generates an interference canceled signal by canceling a signal interference using a demodulated signal of the received signal. In this instance, the signal interference is caused by signals from multiple users.

In operation S130, the method of transmitting and receiving data generates the demodulated signal by demodulating the received signal via a demodulation process using the interference canceled signal. In this instance, the demodulation process is specialized for each user.

Also, the demodulated signal, which is generated by performing operations S120 and S130 at least once beforehand, is adopted as a final demodulated signal.

Additionally, the number of times operations S120 and S130 are successively performed may be predetermined.

In operation S140, the method of transmitting and receiving data adopts the demodulated signal, which is generated by performing operations S120 and S130 by the predetermined number of times, as a final demodulated signal.

In this instance, the demodulation process specialized for each user may be performed by inversely performing the modulation process specialized for each user.

Also, the demodulation process specialized for each user may include a deinterleaving process specialized for each user and a despreading process specialized for each user.

Also, the demodulation process specialized for each user may include detecting a signal via a map detector.

Also, operation S120 may include estimating the demodulated signal, and equalizing the estimated signal in a frequency domain based on an inter-user interference of the estimated signal.

In this instance, when equalizing the estimated signal, a Minimum Mean-Square Error method may be applied to an estimated value of the estimated signal.

Also, operation S120 may include subtracting a contribution portion of a signal from the demodulated signal. In this instance, the signal is used by another user via a communication channel.

Also, operation S120 may include re-modulating the demodulated signal by again performing the modulation process specialized for each user.

Also, operation S120 may include performing a fast Fourier transform (FFT) on the demodulated signal and the received signal, and generating the interference canceled signal by performing an inverse fast Fourier transform (IFFT) on a signal which is generated after equalizing the estimated signal.

In this instance, the modulation process specialized for each user may encode the signal carrier signal via a forward error correction (FEC) block.

Hereinafter, a process of generating a received signal will be described. An input signal block, indicating input data sequence, consists of 0 and 1. The input signal block is encoded via the FEC block and goes through a spreading process for a $u^{th}$ user. In this instance, the spreading process is specialized for each user.

Also, when $c_{u,l}$ indicates a signal which is generated by performing the spreading process, and $c_{u,m}$ indicates a signal which is generated by performing an interleaving process on the signal $c_{u,l}$ for the $u^{th}$ user, indicated as $\Pi_u$, $c_{u,m}$ is a separable signal for each user.

When $c_{u,m}$ is mapped into a quadrature amplitude modulation (QAM) symbol through symbol mapping, the mapped signal is indicated as $x_{u,n}$.

In this instance, when $x_{u,n}$ includes an N number of symbol blocks, a transmitting end places an L number of synchronous blocks after the N number of symbol blocks and thereby transmits a signal. In this case, N>L and the L number of synchronous blocks indicates a cyclic prefix (CP).

Conversely, a receiving end eliminates the length of CP from a front portion of the signal, and generates an N number of received signal blocks. In this instance, N is the same as the size of FFT to be subsequently performed. Also, in one block among the N number of received signal blocks, a received signal at a time n may be represented as $$r_n = \sum_{u=1}^{U} \sum_{l=0}^{L} h_{u,l} x_{u,(n-l)_N} + w_n, \quad 0 \le n < N \qquad \text{[Equation 1]}$$

In this instance, U indicates a total number of users, L+1 indicates a channel length, $(n)_N$ indicates the residue of n modulo N, $h_{u,l}$ indicates a coefficient corresponding to a first channel characteristic of the $u^{th}$ user, $x_{u,(n-1)_N}$ indicates an $[(n-1)_N]^{th}$ symbol of the $u^{th}$ user, and $W_n$ indicates noise.

Figure 2:
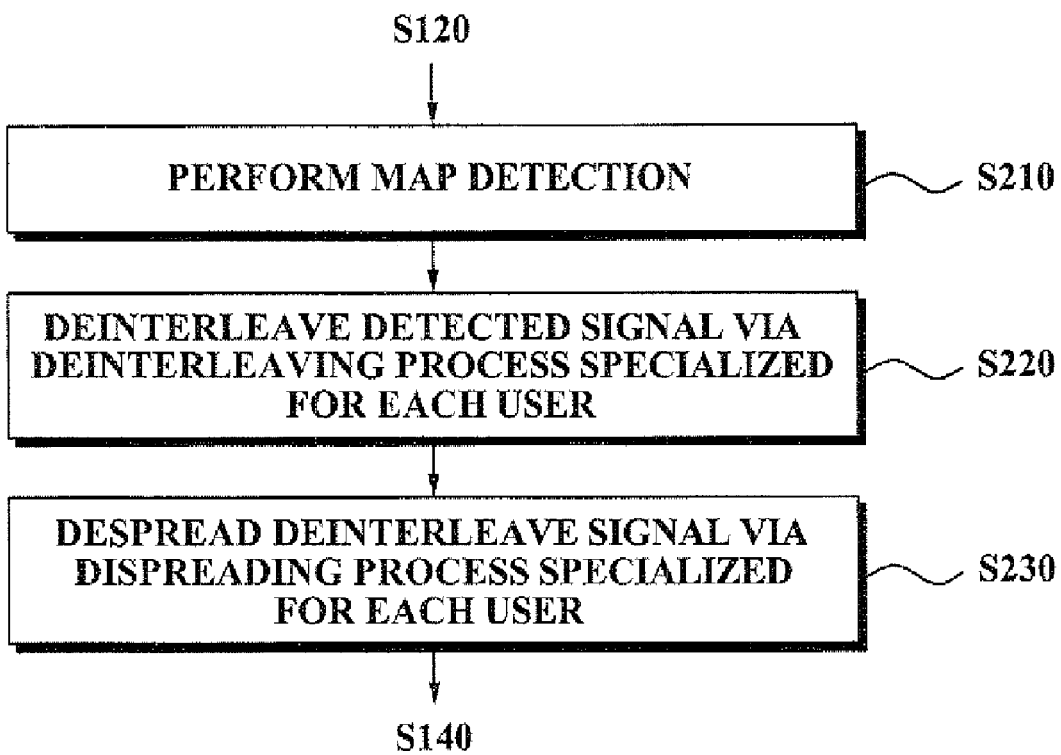
FIG. 2 is a flowchart illustrating an example of generating a demodulated signal shown in FIG. 1.

FIG. 2 is a flowchart illustrating an example of operation S130 of generating the demodulated signal of FIG. 1.

Referring to FIG. 2, in operation S210, a method of transmitting and receiving data according to an exemplary embodiment of the present invention detects an interference canceled signal via a map detector.

The method of transmitting and receiving data deinterleaves the map detected signal via a deinterleaving process specialized for each user in operation S220, and despreads the deinterleaved signal via a despreading process specialized for each user in operation S230.

Figure 3:
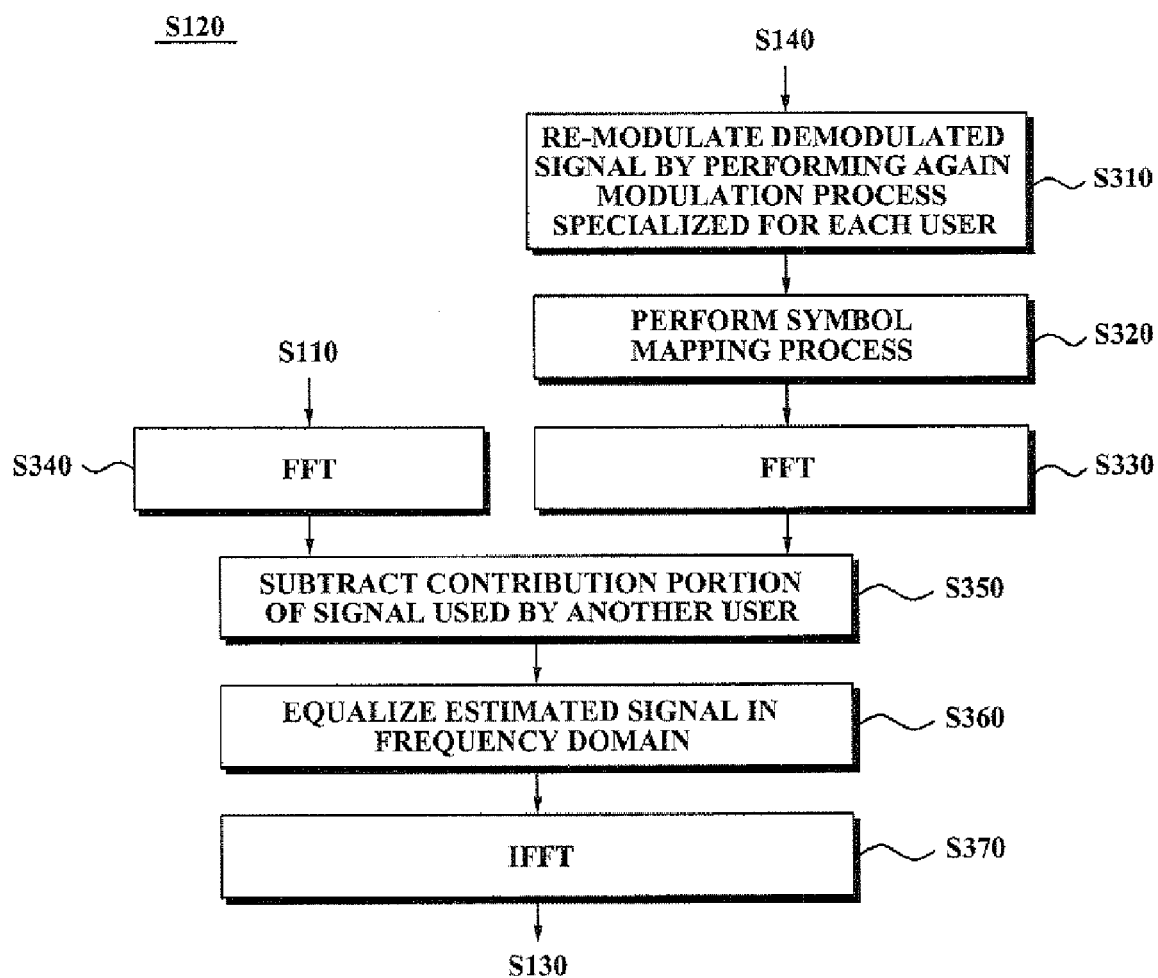
FIGS. 3, 4 and 5 are flowcharts illustrating an example of generating an interference canceled signal described with reference to FIG. 1.

FIG. 3 is a flowchart illustrating an example of operation S120 of generating the interference canceled signal of FIG. 1.

Referring to FIG. 3, a method of transmitting and receiving data according to an exemplary embodiment re-modulates a demodulated signal by performing the modulation process specialized for each user in operation S310, and performs a symbol mapping process with respect to the re-modulated signal in operation S320.

In this instance, the symbol mapping process may correspond to a soft mapping process.

Also, the received signal and the symbol mapped signal are converted from a time domain signal to a frequency domain signal through operations S330 and S340 for FFT.

In operation S350, the method of transmitting and receiving data subtracts a contribution portion of a signal, used by another user, from the frequency domain signal.

In this instance, a signal, generated after performing operation S350, corresponds to the frequency domain signal. However, for ease of description, when time domain signal $z_u = \{z_{u,0}, z_{u,1}, \ldots, z_{u,N-1}\}$ of the $u^{th}$ user is calculated, $z_u$ may be represented as $$z_u = H_u x_u + \sum_{u'=1, u' \ne u}^{U} H_{u'}(x_{u'} - \bar{x}_{u'}) + w \qquad \text{[Equation 2]}$$

In this instance, $x_u$ and $\bar{x}_u$ indicate a transmission symbol vector of the $u^{th}$ user and a mean vector of the transmission symbol vector respectively. The relation between $x_u$ and $\bar{x}_u$ may be represented as $$\bar{x}_{u,n} = E[x_{u,n}]. \quad \text{[Equation 3]}$$

Also, elements of $x_u$ and $\bar{x}_u$ may be respectively represented as $$x_u = \{x_{u,0}, x_{u,1}, \ldots, x_{u,N-1}\}, \quad \text{[Equation 4]}$$

and $$\bar{x}_u = \{\bar{x}_{u,0}, \bar{x}_{u,1}, \ldots, \bar{x}_{u,N-1}\}. \quad \text{[Equation 5]}$$

In this instance, w indicates a vector corresponding to additive white Gaussian noise (AWGN) in which a covariance matrix satisfies, $$E[ww^H] = \sigma_w^2 I_N. \quad \text{[Equation 6]}$$

In this instance, $I_N$ indicates an N by N matrix.
Also, $H_u$ is defined as $$H_u = \text{Circ}_N[h_{u,0}, h_{u,1}, \ldots, h_{u,L}]. \quad \text{[Equation 7]}$$

In this instance, $\text{Circ}_N[h_{u,0}, h_{u,1}, \ldots, h_{u,L}]$ is defined as an N by N circulant matrix, that is, $[h_{u,0}, h_{u,1}, \ldots, h_{u,L}, 0, \ldots, 0]^T$, in which a first string vector includes an N number of elements. Also, the N by N circulant matrix includes a value corresponding to a transmitting/receiving channel characteristic.

In operation S360, the method of transmitting and receiving data performs equalization of a signal generated in operation S350.

In operation S370, the method of transmitting and receiving data performs IFFT of a signal equalized in operation S350.

Figure 4:
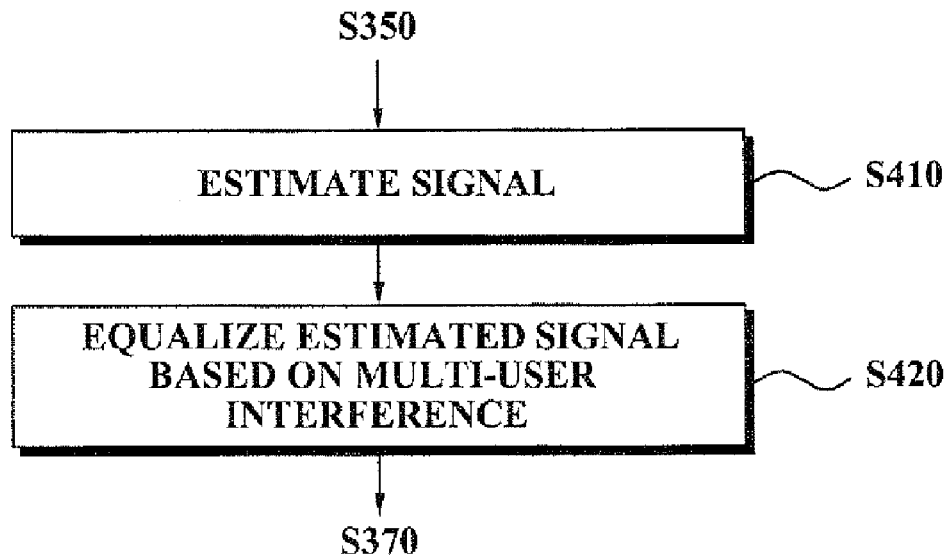

FIG. 4 is a flowchart illustrating an example of operation S360 of equalizing the estimated signal in the frequency domain of FIG. 3.

Referring to FIG. 4, a method of transmitting and receiving data according to an exemplary embodiment of the present invention estimates a signal in which a contribution portion of a signal used by another user is subtracted in operation S410, and equalizes the estimated signal in the frequency domain based on an inter-user interference in operation S420.

Figure 5:
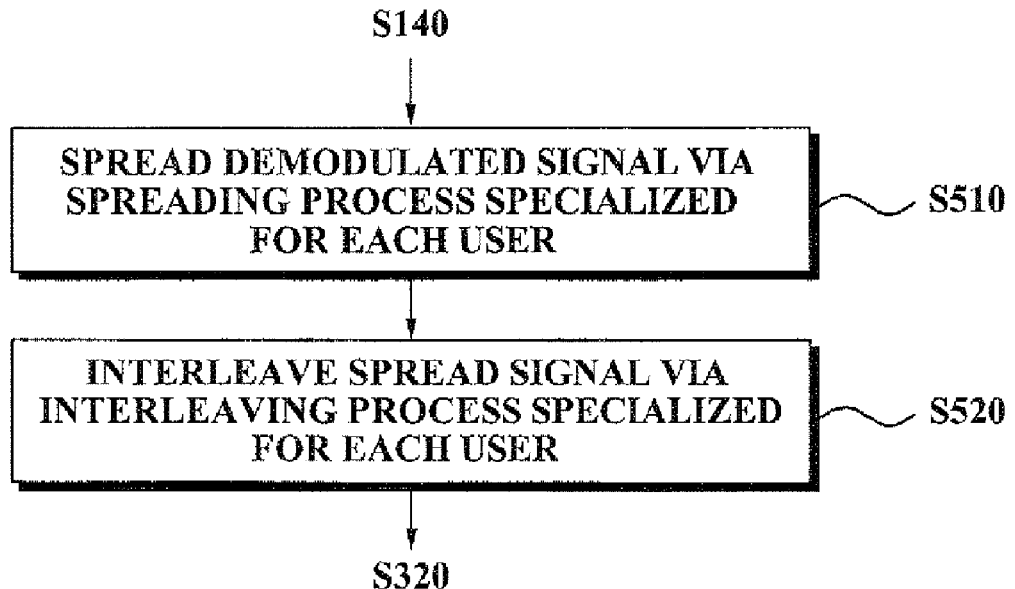

FIG. 5 is a flowchart illustrating an example of operation S310 of re-modulating the demodulated signal FIG. 3.

Referring to FIG. 5, a method of transmitting and receiving data according to an exemplary embodiment of the present invention spreads a demodulated signal via a spreading process specialized for each user in operation S510, and interleaves the spread signal via an interleaving process specialized for each user in operation S520.

In this instance, by using a first signal value of a signal of each user, which is generated by performing the spreading process, and a second signal value of a signal which is generated by performing the deinterleaving process, however, not yet performing the despreading process in operation S120, an extrinsic log-likelihood ratio (LLR) value of the signal $c_{u,l}$, which is generated by performing the spreading process, may be calculated by $$\{L_D(c_{u,l})\}_{l=0}^{M(N-1)}.$$

In this instance, a signal, which is acquired by interleaving a signal which is acquired by subtracting the second signal value from the first signal value, is represented, using the LLR value, as $$\{L_{EA}(c_{u,m})\}_{m=0}^{M(N-1)} = \Pi_u \lfloor \{L_D(c_{u,l})\}_{l=0}^{M(N-1)} \rfloor. \quad \text{[Equation 8]}$$

In this instance, $L_{EA}(c_{u,m})$ indicates a priori information of $c_{u,m}$ and M indicates a modulation index. For example, in the case of a quadric phase shift keying (QPSK) scheme, M=2.

In this instance, the mean vector of transmission symbol $x_{u,n}$ may be calculated by $$\bar{x}_{u,n} = \frac{1}{\sqrt{2}}\{\tan[L_{EA}(c_{u,2n})/2] + i\tan[L_{EA}(c_{u,2n+1})/2]\}. \quad \text{[Equation 9]}$$

The transmission symbol $x_{u,n}$ provides minimum mean-square error (MMSE) to reduce cost function $E(|x_{u,n} - \hat{x}_{u,n}|^2)$. In this instance, estimated value $\hat{x}_{u,n}$ of the transmission symbol $x_{u,n}$ is represented as $$\hat{x}_{u,n} = E\{x_{u,n}\} + c_u^H(z_u - E\{z_u\}) \quad \text{[Equation 10]}$$

In this instance, the estimated value $\hat{x}_{u,n}$ corresponds to an estimated signal. In operation S420, $c_u$ vector corresponding to a tap coefficient may be acquired by using the estimated value $\hat{x}_{u,n}$.

When applying an orthogonal principle, the $c_u$ vector may be calculated by $$c_u = \text{Cov}^{-1}(z_u, z_u)\text{Cov}(z_u, x_{u,n}) \quad \text{[Equation 11]}$$

$$= \left(H_u V_u H_u^H + \sum_{u'=1, u' \neq u}^{U} H_{u'} V_{u'} H_{u'}^H + \sigma_w^2 I_N\right)^{-1} H_u e.$$

In this instance, Cov(x,y) indicates a covariance matrix defined by $\text{Cov}(x,y) = E(xy^H) - E(x)E(y^H)$, $V_u = \text{Cov}(x_u, x_u) = \text{diag}(v_{u,0}, v_{u,1}, \ldots, v_{u,N-1})$, $v_{u,n} = 1 - |\bar{x}_{u,n}|^2$, and $e = [1, 0_{1 \times (N-1)}]^T$.

In this instance, to reduce a calculation complexity, it is possible to utilize an assumption as follows $$V_u = v_u I_N = \frac{1}{N} tr(V_u) I_N. \quad \text{[Equation 12]}$$

By using Equation 12 above, Equation 10 above is reduced to $$\hat{x}_{u,n} = c_u^H(z_u - H_u \bar{x}_u + \bar{x}_{u,n} H_u e). \quad \text{[Equation 13]}$$

Also, by using Equation 12 above, Equation 11 above is reduced to $$c_u \cong \left(v_u H_u H_u^H + \sum_{u'=1, u' \neq u}^{U} v_{u'} H_{u'} H_{u'}^H + \sigma_w^2 I_N\right)^{-1} H_u e. \quad \text{[Equation 14]}$$

Through the calculation in the time domain, $C_u$ corresponding to a tap coefficient matrix in operation S420 is induced to $C_u = F \times c_u$ using a discrete Fourier transform (DFT) matrix F, and is represented as $$C_u = \left( v_u \breve{H}_u \breve{H}_u^H + \sum_{u'=1, u' \neq u}^{U} v_{u'} \breve{H}_{u'} \breve{H}_{u'}^H + \sigma_w^2 I_N \right)^{-1} \breve{H}_u I_{N \times 1}. \quad \text{[Equation 15]}$$

In this instance, $\breve{H}_u$, represented as $\breve{H}_u = F H_u F^{-1}$, indicates a diagonal matrix, and $\breve{H}_{u,k}$, which is a $(k,k)^{th}$ element of $\breve{H}_u$, corresponds to a $k^{th}$ element of a channel impulse response (CIR) for the $u^{th}$ user. A frequency domain expression of the CIR in the frequency domain may be acquired by multiplying a time domain expression by the DFT matrix F.

Accordingly, a tap coefficient for each $k^{th}$ subcarrier is represented as $$C_{u,k} = \frac{\breve{H}_{u,k}}{\sigma_w^2 + \sum_{u=1}^{U} v_u |\breve{H}_{u,k}|^2}. \quad \text{[Equation 16]}$$

The equalization process is performed in the frequency domain. Accordingly, when Equation 16 above is expressed as an equation in the frequency domain, it is represented as $$\hat{X}_{u,k} = C_{u,k}^* Z_{u,k} + \left( 1/N \sum_{k=0}^{N-1} C_{u,k}^* \breve{H}_{u,k} - C_{u,k}^* \breve{H}_{u,k} \right) \overline{X}_{u,k}. \quad \text{[Equation 17]}$$

In this instance, the value transformed into a frequency domain with respect to the estimated value $\hat{x}_{u,n}$ of the transmission symbol $x_{u,n}$, is represented as $\hat{X}_u = F \hat{x}_u$ by the DFT matrix F. Also, $Z_{u,k}$ indicates $z_u$ vector, represented as Equation 2 above, in the frequency domain. $\overline{X}_{u,k}$ indicates a $k^{th}$ element when the mean vector of transmission symbol $x_{u,n}$, represented as Equation 9 above, is represented in the frequency domain.

By using Equation 17 above, an LLR value of a final demodulated signal may be calculated by $$L_E(c_{u,2n}) = \frac{2\sqrt{2} \, \text{Re}\{\hat{x}_{u,n}\} \mu_u}{\sigma_u^2}, \quad \text{[Equation 18]}$$

$$L_E(c_{u,2n+1}) = \frac{2\sqrt{2} \, \text{Im}\{\hat{x}_{u,n}\} \mu_u}{\sigma_u^2}. \quad \text{[Equation 19]}$$

In this instance, $\mu_u$ indicates the mean of signal estimated value $$\{\hat{x}_{u,n}\}_{n=0}^{N-1},$$

and may be calculated by $$\mu_u = \frac{1}{N} \sum_{k=0}^{N-1} C_{u,k}^* \breve{H}_{u,k}. \quad \text{[Equation 20]}$$

Also, $\sigma_u$ indicates the variance of signal estimated value $$\{\hat{x}_{u,n}\}_{n=0}^{N-1},$$

and may by calculated by $$\sigma_u^2 \mu_u - v_u \mu_u^2. \quad \text{[Equation 21]}$$

Figure 6:
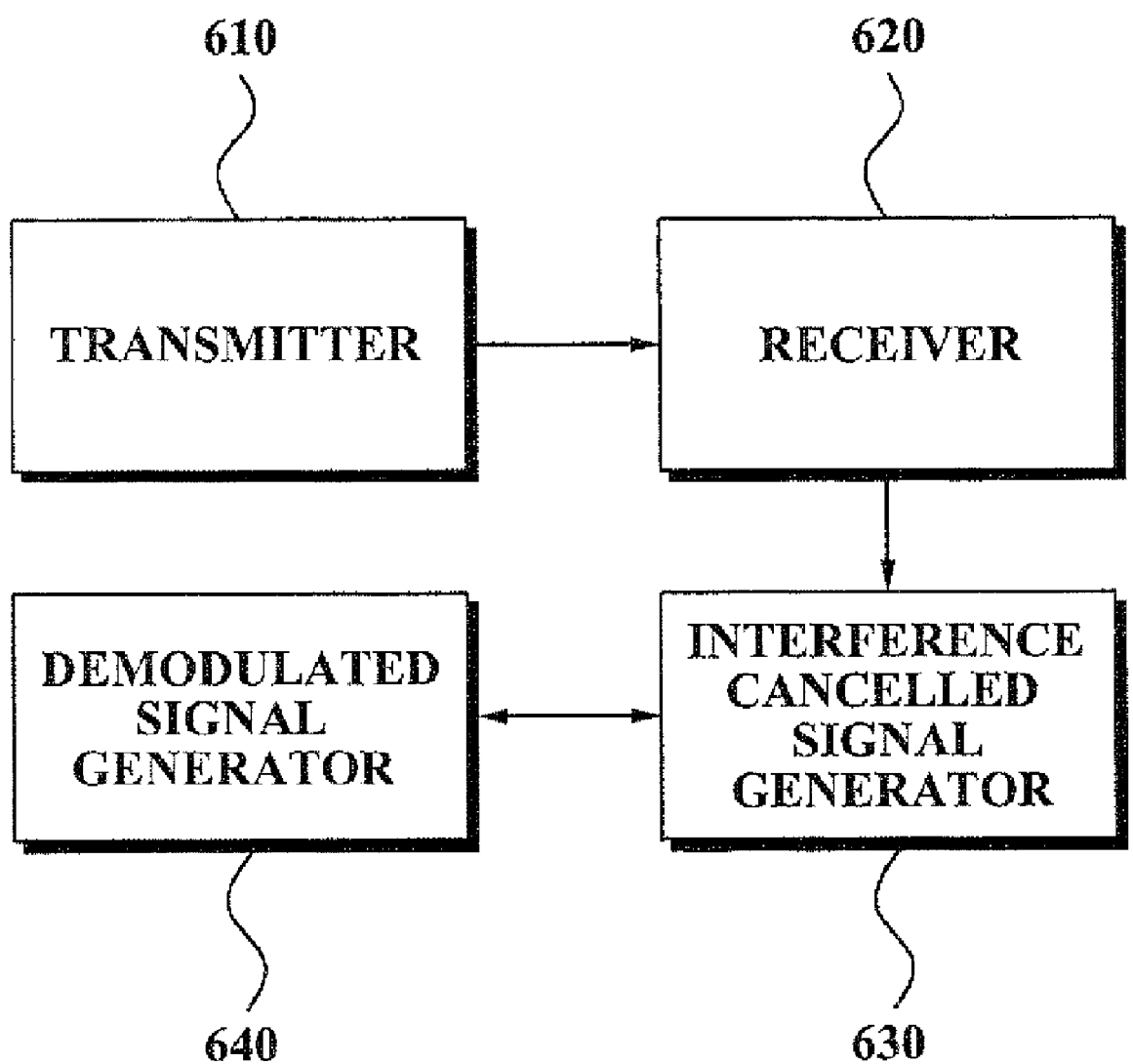
FIGS. 6 and 7 are block diagrams illustrating an apparatus for transmitting and receiving data according to an exemplary embodiment of the present invention.

FIG. 6 is a block diagram illustrating an apparatus for transmitting and receiving data according to an exemplary embodiment of the present invention.

Referring to FIG. 6, the apparatus for transmitting and receiving data includes a receiver 620, an interference canceled signal generator 630, and a demodulated signal generator 640.

In this instance, the apparatus for transmitting and receiving data may further include a transmitter 610.

The receiver 620 receives a transmission signal and generates a received signal. In this instance, the transmission signal is generated by modulating a single carrier signal via a modulation process, specialized for each user, in a wireless communication system Also, the receiver 620 may generate received signal blocks by eliminating a cyclic prefix symbol from a front portion of the received transmission signal sequence.

The interference canceled signal generator 630 generates an interference canceled signal by canceling a multi-user signal interference using a demodulated signal from the received signal.

The demodulated signal generator 640 generates the demodulated signal by demodulating the received signal via a demodulation process using the interference canceled signal. In this instance, the demodulation process is specialized for each user.

The apparatus for transmitting and receiving data adopts the demodulated signal, which is generated by using the interference canceled signal generator 630 and the demodulated signal generator 640 at least once, as a final demodulated signal.

In this instance, a number of times the interference canceled signal generator 630 and the demodulated signal generator 640 are utilized may be predetermined.

Also, the demodulation process specialized for each user may be performed by inversely performing the modulation process specialized for each user.

Also, the demodulation process specialized for each user may utilize a deinterleaver which is specialized for each user and a despreader which is specialized for each user.

Also, the demodulation process specialized for each user may utilize a map detector which detects a symbol mapped signal.

Also, the interference canceled signal generator 630 may include a signal estimator and a signal equalizer. The signal estimator estimates the demodulated signal, and the signal equalizer equalizes the estimated signal in a frequency domain based on a user interference of the estimated signal In this instance, the signal equalizer may reduce a Mean-Square Error by an estimated value of the estimated signal.

Also, the interference canceled signal generator 630 may include a multi-user interference canceller which subtracts a contribution portion of a signal from the demodulated signal. In this instance, the signal is used by another user via a communication channel.

Also, the interference canceled signal generator 630 may include a re-modulator which re-modulates the demodulated signal by again performing the modulation process specialized for each user.

Also, the interference canceled signal generator 630 may include a fast Fourier transformer which performs a fast Fourier transform (FFT) on the demodulated signal and the received signal, and an inverse fast Fourier transformer which generates the interference canceled signal by performing an inverse fast Fourier transform (IFFT) on a signal in which the signal interference caused by the multi-user is canceled.

In this instance, the modulation process specialized for each user may encode the single carrier signal via a FEC block.

Hereinafter, a process of generating a received signal will be described. An input signal block, indicating input data sequence, consists of 0 and 1. The input signal block is encoded via a FEC process and goes through a spreading process for a $u^{th}$ user. In this instance, the spreading process is specialized for each user.

Also, when $c_{u,l}$ indicates a signal which is generated by performing the spreading process, and $c_{u,m}$ indicates a signal which is generated by performing an interleaving process on the signal $c_{u,l}$ for the $u^{th}$ user, indicated as $\Pi_u$, $c_{u,m}$ is a separable signal for each user.

When $c_{u,m}$ is mapped into a QAM symbol through symbol mapping, the mapped signal is indicated as $x_{u,n}$.

In this instance, when $x_{u,n}$ includes an N number of symbol blocks, a transmitting end places an L number of synchronous blocks after the N number of symbol blocks and thereafter transmits a signal. In this case, N>L and the L number of synchronous blocks indicates a CP.

Conversely, a receiving end eliminates the length of CP from a front portion of the signal, and generates an N number of received signal blocks. In this instance, N is the same as the size of the FFT to be subsequently performed. Also, in one block among the N number of received signal blocks, a received signal at a time n may be represented as Equation 1 above.

Figure 7:
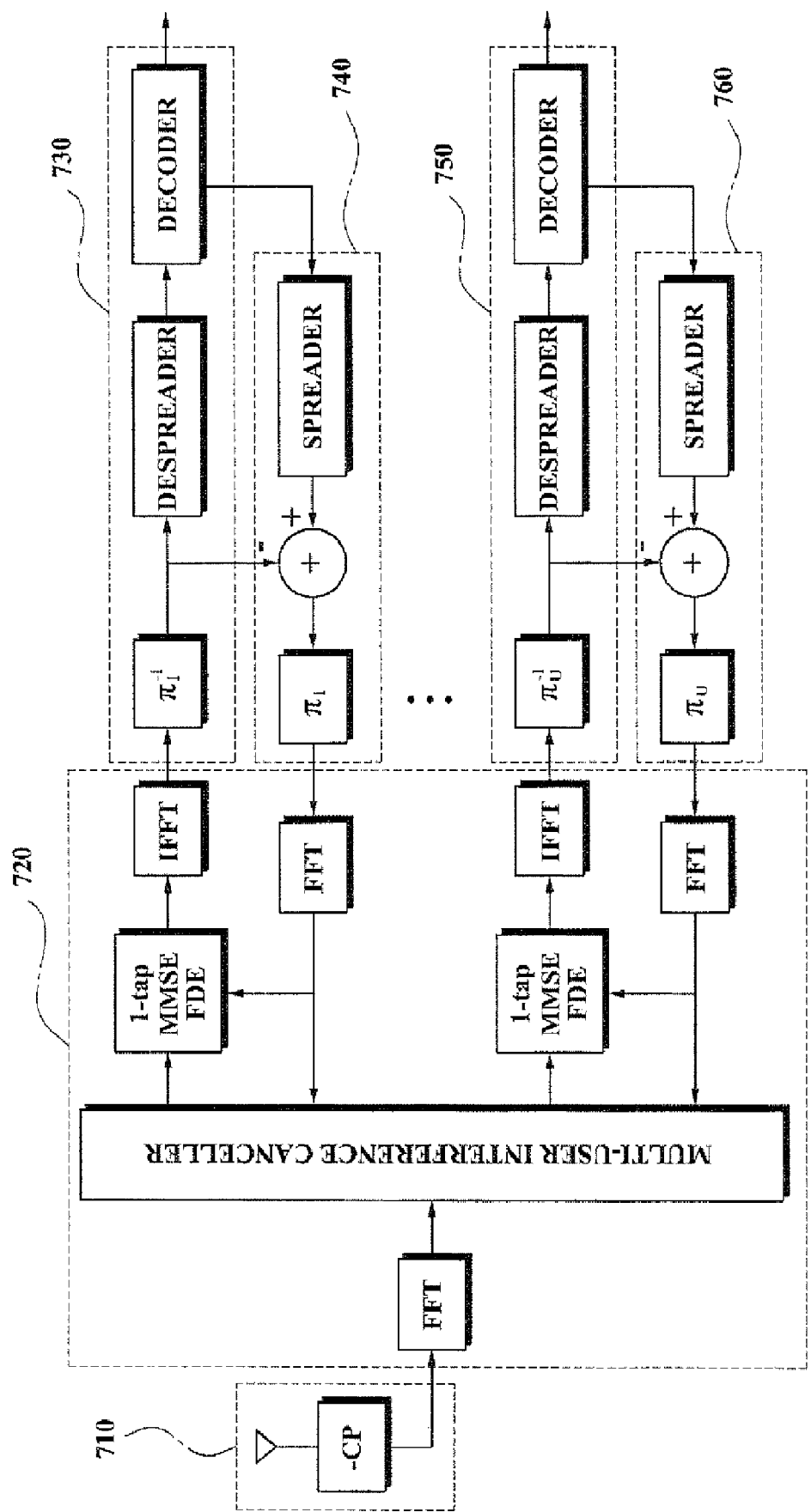

FIG. 7 is a block diagram illustrating an apparatus for transmitting and receiving data according to an exemplary embodiment of the present invention.

Referring to FIG. 7, the apparatus for transmitting and receiving data includes a receiver 710, an interference canceled signal generator 720, and a plurality of demodulated signal generators 730 and 750.

In this instance, each of the plurality of demodulated signal generators 730 and 750 includes a deinterleaver and a despreader.

Also, each of the plurality of demodulated signal generators 730 and 750 may further include a map detector.

The map detector detects the interference canceled signal, and the deinterleaver specialized for each user deinterleaves the map detected signal.

Also, the despreader specialized for each user despreads the deinterleaved signal.

Also, the interference canceled signal generator 720 may include a plurality of re-modulators 740 and 760.

In this instance, each of the plurality of re-modulators 740 and 760 re-modulates the modulated signal via the modulation process specialized for each user.

Also, each of the plurality of re-modulators 740 and 760 may further include a symbol mapper.

The symbol mapper performs symbol mapping on the re-modulated signal.

Also, the symbol mapping may correspond to soft mapping.

Also, the interference canceled signal generator 720 may include a fast Fourier transformer, a multi-user interference canceller, an MMSE frequency domain equalizer (FDE), and an inverse fast Fourier transformer.

In this instance, the fast Fourier transformer converts a received signal and a re-modulated signal from time domain signals into frequency domain signals.

Also, the multi-user interference canceller generates a signal by subtracting a contribution portion of a signal, used by another user, from the frequency domain signal.

In this instance, the signal, which is generated by subtracting the contribution portion of the signal, corresponds to a fast Fourier transformed frequency domain signal. However, for ease of description, when time domain signal $z_u=\{z_{u,0}, z_{u,1}, \ldots, z_{u,N-1}\}$ of the $u^{th}$ user is calculated, $z_u$ may be represented as Equation 2 above.

Also, the apparatus for transmitting and receiving data includes a signal estimator and a signal equalizer.

The signal estimator estimates the signal in which the contribution portion of the signal is subtracted, and the signal equalizer equalizes the estimated signal in a frequency domain based on user interference of the estimated signal.

Also, each of the plurality of re-modulators 740 and 760 includes a spreader and an interleaver.

The spreader spreads the demodulated signal via a spreading process specialized for each user, and the interleaver interleaves the spread signal via an interleaving process specialized for each user.

In this instance, by using a first signal value of a signal of each user, which is generated by performing the spreading process, and a second signal value of a signal which is generated by performing the deinterleaving process, however, not yet performing the despreading process via the demodulated signal generators 730 and 750, an LLR value of the signal $c_{u,l}$, which is generated by performing the spreading process, may be calculated by $$\{L_D(c_{u,l})\}_{l=0}^{M(N-1)}$$

In this instance, a signal, which is acquired by interleaving a signal which is acquired by subtracting the second signal value from the first signal value, is represented as Equation 8 above, using the LLR value.

In this instance, M indicates a modulation index. For example, in the case of a QPSK scheme, M=2.

In this instance, the mean vector of transmission symbol $x_{u,n}$ may be calculated by Equation 9 above.

The transmission symbol $x_{u,n}$ provides an MMSE to reduce cost function $E(|x_{u,n}-\hat{x}_{u,n}|^2)$. In this instance, estimated value $\hat{x}_{u,n}$ of the transmission symbol $x_u$ µl is represented as Equation 10 above.

In this instance, the estimated value $\hat{x}_{u,n}$ corresponds to an estimated signal. Also, the signal equalizer may acquire $C_u$ vector corresponding to a tap coefficient by using the estimated value $\hat{x}_{u,n}$.

When applying an orthogonal principle, the $c_u$ vector may be calculated by Equation 11.

In this instance, to reduce a calculation complexity, it is possible to utilize the assumption of Equation 12 above.

By using Equation 12 above, Equation 10 above is reduced to Equation 13 above.

Also, by using Equation 12 above, Equation 11 above is reduced to Equation 14 above.

Through the calculation in the time domain, $C_u$ corresponding to a tap coefficient matrix in the signal equalizer is induced to $C_u = F \times c_u$ using a DFT matrix F, and is represented as Equation 15 above.

Accordingly, a tap coefficient for each $k^{th}$ subcarrier is represented as Equation 16 above.

The equalization process is performed in the frequency domain. Accordingly, when Equation 16 above is expressed as an equation in the frequency domain, it is represented as Equation 17 above.

In this instance, the value transformed into frequency domain with respect to the estimated value $\hat{x}_{u,n}$ of the transmission symbol $\hat{x}_{u,n}$, is represented as $\hat{X}_u = F\hat{x}_u$ by the DFT matrix F. Also, $Z_{u,k}$ indicates $z_u$ vector, represented as Equation 2 above, in the frequency domain. $\overline{X}_{u,k}$ indicates a $k^{th}$ element when the mean vector of transmission symbol $x_{u,n}$, represented as Equation 9 above, is represented in the frequency domain.

By using Equation 17 above, an LLR value of a final demodulated signal may be calculated by Equation 18 and Equation 19 above.

In this instance, $\mu_u$ indicates the mean of signal estimated value $$\{\hat{x}_{u,n}\}_{n=0}^{N-1},$$

and may be calculated by Equation 20 above.

Also, $\sigma_u$ indicates the variance of signal estimated value $$\{\hat{x}_{u,n}\}_{n=0}^{N-1},$$

and may be calculated by Equation 21 above.

Figure 8:
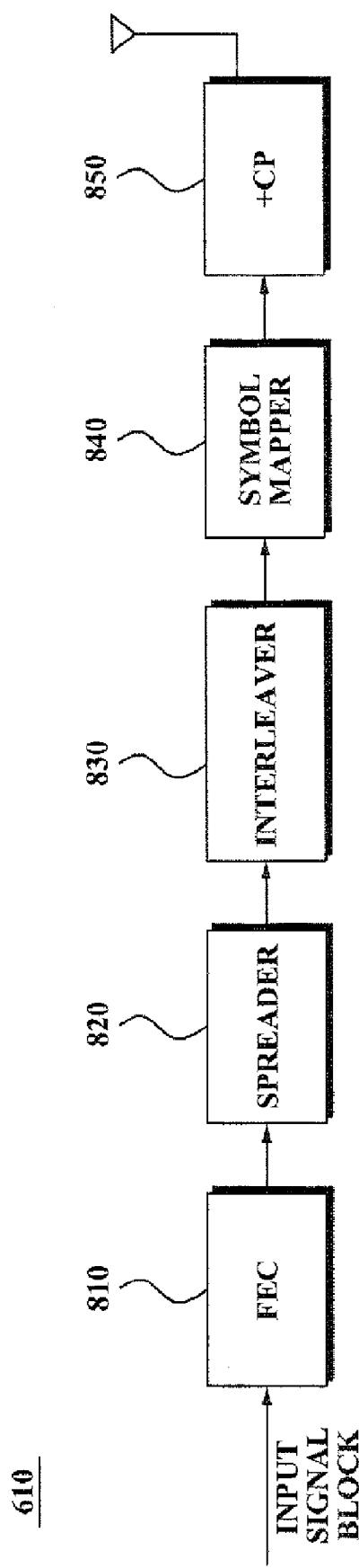
FIG. 8 is a block diagram illustrating an example of a transmitter shown in FIG. 6.

FIG. 8 is a block diagram illustrating an example of the transmitter 610 shown in FIG. 6.

Referring to FIG. 8, the transmitter 610 of an apparatus for transmitting and receiving data according to an exemplary embodiment includes a FEC block 810, a spreader 820, which is specialized for each user, an interleaver 830, which is specialized for each user, a symbol mapper 840, and a CP processor 850.

The CP processor 850 places an L number of synchronous blocks after the N number of symbol blocks and thereby transmits a signal. In this case, N>L and the L number of synchronous blocks indicates a CP.

The method of transmitting and receiving data according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, there is provided a method and apparatus for transmitting and receiving data by performing an iterative multi-user detection using a frequency domain equalizer.

Also, according to the present invention, it is possible to cancel multi-user interference and thereby improve bit error performance and cell capacity.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of transmitting and receiving data, the method comprising:
   receiving a transmission signal generated by modulating a single carrier signal via a modulation process, unique for each user, in a wireless communication system;
   generating a received signal from the received transmission signal;
   canceling a signal interference using a prior demodulated signal of the received signal, the signal interference being caused by another user and generating an interference canceled signal; and
   generating a current demodulated signal by demodulating the received signal via a demodulation process using the interference canceled signal, the demodulation process being unique for each user.

2. The method of claim 1, wherein the current demodulated signal, which is generated by performing the generating of the interference canceled signal and a prior generating of the prior demodulated signal, is a final demodulated signal.

3. The method of claim 1, wherein the demodulation process unique for each user is performed by inversely performing the modulation process which is unique for each user.

4. The method of claim 3, wherein the demodulation process unique for each user includes a deinterleaving process unique for each user and a despreading process unique for each user.

5. The method of claim 3, wherein the generating of the interference canceled signal comprises:
   estimating the prior demodulated signal; and
   equalizing the estimated prior demodulated signal in a frequency domain based on inter-user interference of the estimated prior demodulated signal,
   wherein the equalizing reduces a Mean-Square Error by an estimated value of the estimated prior demodulated signal.

6. The method of claim 5, wherein an equalization coefficient $C_{u,k}$ for a $k^{th}$ subcarrier for a $u^{th}$ user of the equalizing is determined by $$C_{u,k} = \frac{\tilde{H}_{u,k}}{\sigma_w^2 + \sum_{u=1}^{U} v_u |\breve{H}_{u,k}|^2}$$

where $\breve{H}_{u,k}$ indicates a discrete Fourier transform (DFT) coefficient of a channel impulse response to the $k^{th}$ subcarrier for the $u^{th}$ user, $\sigma_w^2$ indicates a coefficient of a covariance matrix of additive white Gaussian noise (AWGN), and $v_u$ indicates a diagonal element of a covariance matrix of a time domain signal for the $u^{th}$ user.

7. The method of claim 3, wherein the generating of the interference canceled signal comprises:
   subtracting a contribution portion of a signal from the prior demodulated signal, the signal being used by the other user via a communication channel.

8. The method of claim 3, wherein the generating of the interference canceled signal comprises:
   re-modulating the prior demodulated signal by again performing the modulation process unique for each user.

9. The method of claim 3, wherein the demodulation process unique for each user detects symbol mapped signal via a map detector.

10. The method of claim 3, wherein the modulation process specialized for each user encodes the single carrier signal via a forward error correction block.

11. The method of claim 3, wherein the generating of the received signal comprises:
    generating received signal blocks by eliminating a cyclic prefix symbol from a front portion of the received signal.

12. The method of claim 3, wherein the generating of the interference canceled signal comprises:
    performing a fast Fourier transform (FFT) with respect to the prior demodulated signal and the received signal; and
    generating the interference canceled signal by performing an inverse fast Fourier transform (IFFT) with respect to a signal in which the signal interference caused by the other user is canceled.

13. An apparatus for transmitting and receiving data, the apparatus comprising:
    a receiver which receives a transmission signal generated by modulating a single carrier signal via a modulation process, unique for each user, in a wireless communication system;
    an interference canceled signal generator which cancels a signal interference using a prior demodulated signal of the received signal, the signal interference being caused by another user and generates an interference canceled signal; and
    a demodulated signal generator which generates the prior demodulated signal by demodulating the received signal via a demodulation process using the interference canceled signal, the demodulation process being unique for each user.

14. The apparatus of claim 13, wherein a current demodulated signal, which is generated by using the interference canceled signal generator and the demodulated signal generator at least once, is a final demodulated signal.

15. The apparatus of claim 13, wherein the demodulation process unique for each user is performed by inversely performing the modulation process which is unique for each user.

16. The apparatus of claim 15, wherein the demodulation process unique for each user utilizes a deinterleaver which is specialized for each user and a despreader which is unique for each user.

17. The apparatus of claim 15, wherein the interference canceled signal generator comprises:
    a signal estimator which estimates the prior demodulated signal; and
    a signal equalizer which equalizes the estimated prior demodulated signal in a frequency domain based on an inter-user interference of the estimated prior demodulated signal, and
    the signal equalizer reduces a Mean-Square Error by an estimated value of the estimated prior demodulated signal.

18. The apparatus of claim 17, wherein an equalization coefficient $C_{u,k}$ for a $k^{th}$ subcarrier for a $u^{th}$ user of the equalizing is determined by $$C_{u,k} = \frac{\breve{H}_{u,k}}{\sigma_w^2 + \sum_{u=1}^{U} v_u |\breve{H}_{u,k}|^2}$$

where $\breve{H}_{u,k}$ indicates a DFT coefficient of a channel impulse response to the $k^{th}$ subcarrier for the $u^{th}$ user, $\sigma_w^2$ indicates a variance coefficient of a covariance matrix of AWGN, and $v_u$ indicates a diagonal element of a covariance matrix of a time domain signal for the $u^{th}$ user.

19. The apparatus of claim 15, wherein the interference canceled signal generator comprises:
    a multi-user interference canceller which subtracts a contribution portion of a signal from the prior demodulated signal, the signal being used by the other user via a communication channel.

20. The apparatus of claim 15, wherein the interference canceled signal generator comprises:
    a re-modulator which re-modulates the prior demodulated signal by again performing the modulation process unique for each user.

21. The apparatus of claim 15, wherein the demodulation process unique for each user utilizes a map detector which detects a symbol mapped signal.

22. The apparatus of claim 15, wherein the modulation process specialized for each user encodes the single carrier signal via a forward error corrector.

23. The apparatus of claim 15, wherein the receiver generates received signal blocks by eliminating a cyclic prefix symbol from a front portion of the received signal.

24. The apparatus of claim 15, wherein the interference canceled signal generator comprises:
    a fast Fourier transformer which performs an FFT on the demodulated signal and the received signal; and
    an inverse fast Fourier transformer which generates the interference canceled signal by performing an IFFT on a signal in which the signal interference caused by the other user is canceled.

25. The apparatus of claim 15, further comprising:
    a transmitter which generates the transmission signal and transmits the generated transmission signal.

* * * * *